March 5, 1963 H. JACOBEL, JR., ETAL 3,080,554
MODULAR TYPE INDICATOR
Filed Jan. 25, 1961 2 Sheets-Sheet 1
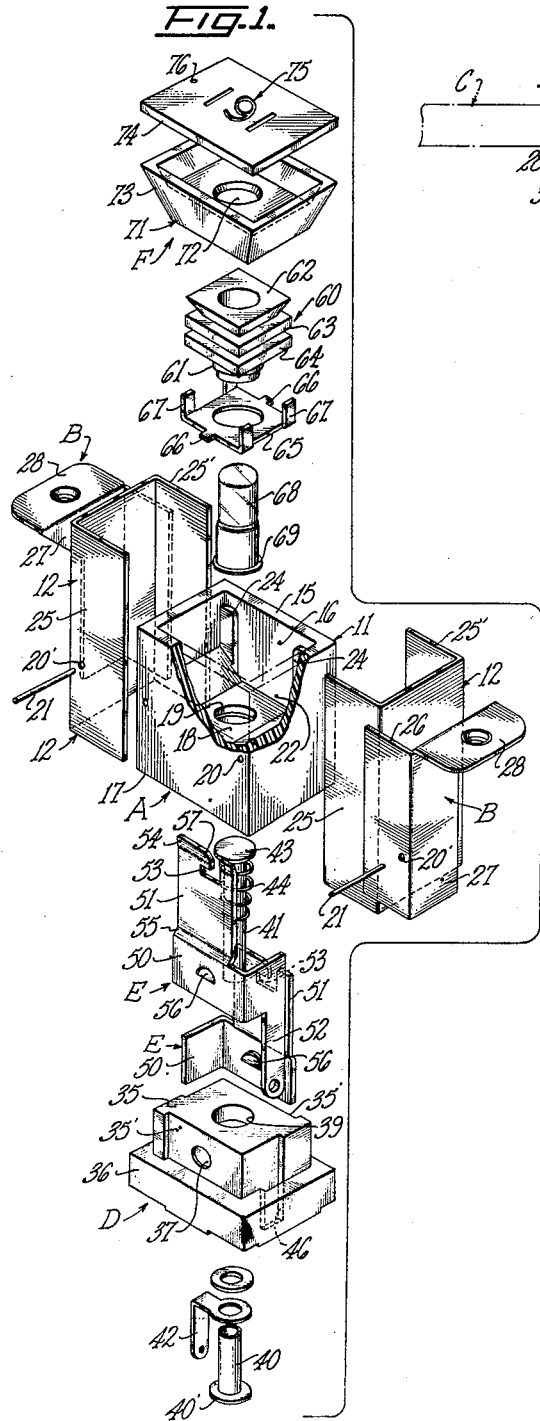
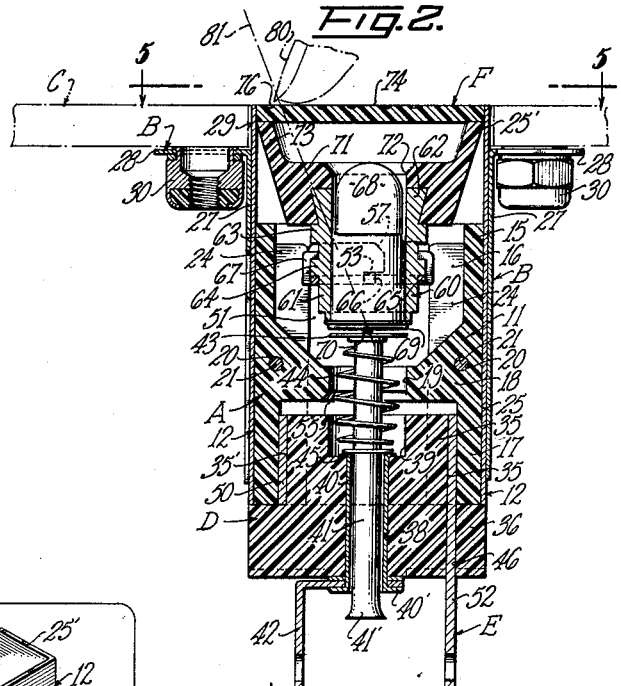
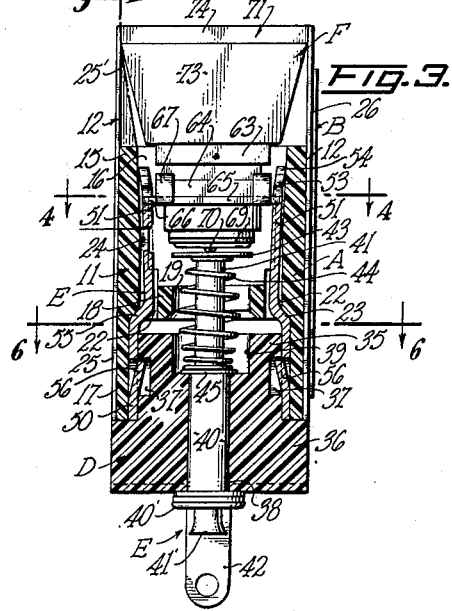
INVENTORS
HERBERT JACOBEL, JR.
THOMAS W. JENTGES
BY
ATTORNEY March 5, 1963 H. JACOBEL, JR., ETAL 3,080,554
MODULAR TYPE INDICATOR
Filed Jan. 25, 1961 2 Sheets-Sheet 2
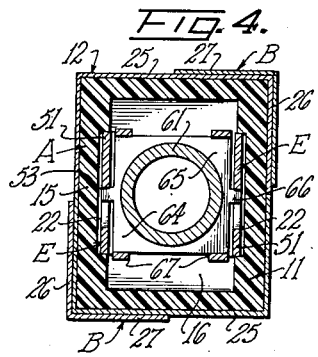
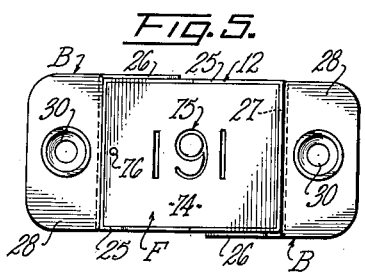
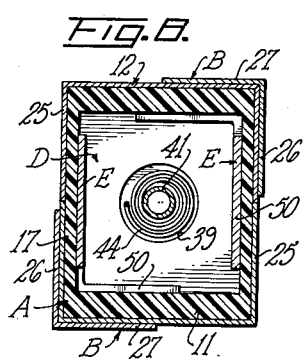
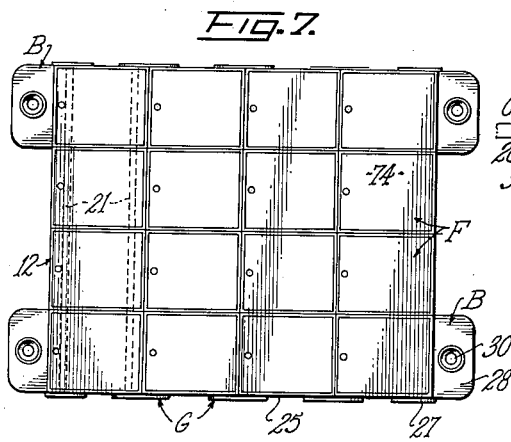
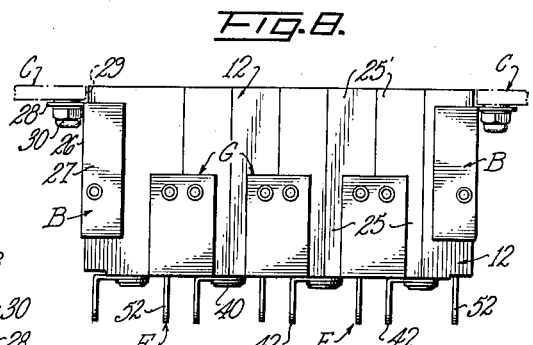
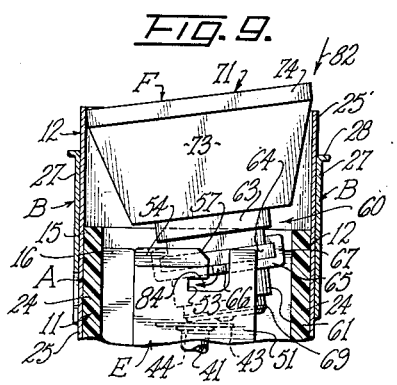
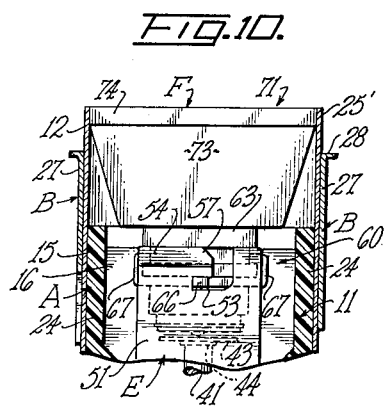
INVENTORS
HERBERT JACOBEL, JR.
THOMAS W. JENTGES
BY
ATTORNEY United States Patent Office 3,080,554
Patented Mar. 5, 1963

3,080,554
MODULAR TYPE INDICATOR
Herbert Jacobel, Jr., Anaheim, and Thomas W. Jentges, Orange, Calif., assignors to Marco Industries Company, Anaheim, Calif., a corporation of California
Filed Jan. 25, 1961, Ser. No. 84,858
9 Claims. (Cl. 340—378)

This invention relates to indicator light units of the modular type. The term "modular," as used herein refers to a small unit, particularly one with an indicator face of small area, adapted particularly for use in a multiple array of such units fitted closely to one another in vertical columns or horizontal rows, or both. More specifically, the indicator unit to which we have applied this term is one having a rectangular indicator face which is substantially coextensive in area with the cross sectional area of the indicator light housing, whereby, when a plurality of such units are stacked one upon another in a plurality of vertical tiers arranged side by side, the plurality of indicator faces will collectively present a substantially uninterrupted composite indicator panel on which a large number of separate indicia, arranged in vertical columns and horizontal rows, can be individually displayed by illuminating their respective indicator units.

The invention contemplates the utilization of a miniature light bulb (e.g. a small neon or incandescent bulb) in each of the indicator units for illuminating its respective indicator face; and is directed particularly to the problem of servicing, such as replacement of burned-out bulbs. To this end, a primary object of the invention is to provide an indicator light unit having a readily removable indicator face cap normally closing the forward end of the indicator unit housing.

In an earlier modular indicator unit developed experimentally, a "push-in—pull-out" indicator cap of rectangular cross section was telescoped into a close-fitting housing of rectangular tubular form and held by a snug friction fit. Due to the tendency of such a cap unit to slide out of the tubular housing under the effect of vibration, the need for a more secure attachment became apparent, and the present invention is aimed at satisfying that need by providing a positive latching means for holding the indicator cap telescoped in the housing in a fixed position with its indicator face lying in a common plane with the indicator faces of surrounding units.

A further object of the invention is to provide an indicator unit of the type indicated above, wherein the latching and unlatching of the indicator cap is accomplished by actuation of the cap itself rather than a separate latch actuator, in order that the composite indicator face presented by the assembled group of individual indicator caps may present a substantially continuous illuminable indicator surface, free of any forwardly projecting latch-actuator buttons or handles. More specifically, the invention provides an arrangement of indicator housing and indicator cap having cooperable means for latching one to the other, adapted to be latched and released by pressure applied to the indicator faces of the cap at a designated point.

Other objects and advantages will become apparent in the ensuing specifications and appended drawings, in which:

FIG. 1 is an exploded view of an indicator unit embodying our invention;

FIG. 2 is a longitudinal axial sectional view of the same;

FIG. 3 is a transverse axial sectional view of the same;

FIG. 4 is a transverse sectional view of the same taken on the line 4—4 of FIG. 3;

FIG. 5 is a front face view of the unit taken as indicated by the line 5—5 of FIG. 2;

FIG. 6 is a transverse sectional view taken on the line 6—6 of FIG. 3;

FIG. 7 is a face view of an assembly of our improved modular indicator units;

FIG. 8 is an inverted plan view of said assembly;

FIG. 9 is a sectional view taken on the line 9—9 of FIG. 3, illustrating the operation of attaching the indicator cap; and FIG. 10 is a sectional view taken on the same plane as FIG. 9 but illustrating the cap in its latched position.

*General Description*

Referring now to the drawings in detail, and in particular to FIGS. 2 and 3, I have shown therein, as an example of one form in which the invention may be embodied, an indicator unit comprising, in general, a housing A of rectangular tubular form including a core 11 of substantially rigid insulating material such as molded synthetic resin plastic, and a sheet metal jacket 12; a pair of mounting brackets B, fabricated of sheet metal, for mounting the indicator units to one another and to a mounting panel C; a rear end cap D, of molded insulating material (which may be the same as that of core 11) fitted into the rear end of core 11; a pair of combined terminal and latch-keeper units E, of metal, fitted between the telescoping portions of housing A and rear end cap D; an indicator cap and light bulb assembly F latched into the forward end of housing A; and a pair of bridge plates G for joining adjacent indicator units to one another (FIG. 8).

Jacket 12 and core 11 cooperatively provide a housing comprising the core 11 as a rear end portion and a thin-wall rectangular sleeve portion projecting forwardly therefrom to receive the indicator cap F. The latter is received within this sleeve portion of the housing as indicated in FIG. 2, with its indicator face flush with the forward end of the sleeve and fitted snugly therein. In an assembly of several vertical tiers of the indicator units as shown in FIG. 7, the opaque edge surfaces of the forward sleeve portions of the housings will cooperatively define a rectangular grid or lattice framing the individual indicator faces as shown in FIG. 7. The indicator faces of cap units F are of light-transmitting character (preferably translucent).

*Detailed Description*

In housing A, core 11 comprises a rectangular tubular forward portion 15 defining a recess 16 to receive the rearward portion of indicator cap unit F; a rear portion 17 providing a rectangular socket to receive the shank of rear end cap D; and a central web portion 18 which has in its center a circular opening 19 establishing communication between the socket 17 and the recess 16. In the respective sides of web 18 are a pair of transverse bores 20 to receive rivets or bolts 21 for securing the brackets B to the core A, and for securing tiers of the units to one another, through bridge plates G. Jacket 12 consists of a pair of channels or sleeve sections 25, each having opposed apertures 20' to receive bolts 21 by means of which they are secured in assembly to core 11.

Formed in respective sides of web 18 are longitudinally extending elongated rectangular slots 22 (FIG. 3) each of which is flared outwardly at its rear end to define an offset shoulder 23 at the base of the socket 17. Each slot 22 extends transversely between a pair of elongated lands 24 extending parallel to the major axis of core 11. There is a pair of lands 24 at each side of the core 11 and between each pair there is defined a shallow flat longitudinally extending recess to receive a portion of unit E.

Bracket B, of stamped sheet metal construction, comprises a sleeve section 25 of rectangular channel form and a bracket part of angle form including a leg 26 secured by welding (or simply by means of rivet 21)

to one side of a respective sleeve section 25, a leg 27 in face to face contact with the central web of sleeve section 25; and a tab 28 formed integrally with and bent at right angles from one end of the leg 27 and offset rearwardly from the adjacent end of sleeve section 25 so as to seat against the rear surface of mounting panel C as shown in FIG. 2, with a forwardly projecting sleeve portion 25' extending through an aperture 29 in the panel C. To the rear face of each tab 28 is secured a locking nut 30 to receive a mounting screw passed through a suitable aperture in panel C, for securing the unit to the panel.

Rear end cap D comprises a shank portion 35 projecting forwardly from a flanged rectangular head 36 having a periphery matching that of core A while the periphery of shank 35 is such as to fit snugly within socket 17. The cross sectional contour of shank 35 is rectangular, modified to Z-form by L-recesses 35' in diagonally opposite corners thereof (FIG. 1). In opposite sides of shank 35 are dimples 37. Extending through the end cap D along the major axis thereof is a bore 38 having a counterbore 39 at its inner end.

Mounted in the bore 38 is a tubular terminal bushing 40, which has at its rear end a head 40' abutting the cap head 39. Through bushing 40 is extended a terminal plunger contact 41. A terminal tail 42 is secured beneath a flanged head 40' on the rear end of bushing 40. Plunger 41 has at its rear, outer end an outwardly swaged head 41' and, at its inward, forward end, a head 43 abutted against one end of a barrel spring 44. The other end of spring 44 is seated in the counterbore 39, against the inner end of bushing 40, which is riveted outwardly against the bottom of counterbore 39, at 45. Plunger 41 is slidable axially in the bushing 40 and is urged forwardly by the barrel spring 44, the head 41' retaining it in assembly when the rear end cap unit D is withdrawn from the housing. The head 43 functions as a contact which is yieldingly pressed against the rear end of the lamp bulb of indicator cap F, with the plunger 41 retracted to the extent that the head 41' is shown projecting from bushing head 40' in FIG. 3.

In one end of the flanged head 36, communicating with the shorter arm of a respective L-recess 35', lying in the plane of said shorter arm, and projecting entirely through the flange of head 36 parallel to the axis of bore 39, is a shallow flat passage 46, shown in phantom in FIG. 1.

Terminal-latch keeper unit E comprises, in one instance, a Z-body of stamped sheet metal (e.g. spring brass) comprising an offset central web 50 of angle form, a latch keeper bar 51 projecting from one side of a longer arm of web 50, and a terminal tail 52 of straight bar form projecting from the opposite side of the other (shorter) arm of web 50. The arms of web 50 (and correspondingly, the keeper bar 51 and terminal tail 52) are disposed in planes at right angles to one another and are joined by an integral bend. Opening into the forward end of keeper bar 51 is a bayonet slot 53. The forward tip portions of bar 51 on respective sides of bayonet slot 53 are dihedrally bent outwardly at a small angle to provide wings 54 which, in the assembled indicator unit as shown in FIG. 3, provide a flaring mouth to receive the rear portions of indicator cap F.

Only one of the units E has the terminal tail 52. The other one, shown in the background in FIG. 1, consists in a keeper bar 51 and the angle web 50 without a tail.

In the assembled unit, the angular webs 50 of the terminal-keeper units E are received in the L-recesses 35' in shank 35 of rear end cap D, the terminal tail 52 extends rearwardly through the passage 46 in the flanged head 36 of rear end cap D, and the keeper bars 51 project forwardly through the apertures 22 in the central web 18 of the core A. The keeper bars 51 are joined integrally to their respective webs 50 by shoulder offsets 55 which seat against the shoulders 23 of web 18 to brace and position the units E in assembly. The keeper bars 51 are laterally positioned between the elongated lands 24 of core A and disposed in the recesses defined there between. The terminal-keeper units E are secured in assembly by engagement of their L-webs 50 in the L-recesses 35' between the flat walls of the latter and the opposed inner walls of socket 17, as illustrated in FIGS. 2 and 3. The depth of recesses 35' is such as to provide a snug fit. The keeper bars 51 are preformed so that their winged tips 54 will bear against the inner walls of sleeve member 15. Secure longitudinal positioning of socket units E is provided for by the snug bearing of offsets 55 against shoulders 23 while the rear ends of L-webs 50 are seated snugly against the shouldered forward face of flanged head 36.

Formed in the longer arms of L-webs 50 are punched nibs 56 which project inwardly and engage in the dimples 37 in the respective sides of the shank 35 of rear end cap D. The nibs 56 assist the shoulders 55 in retaining the keeper bars 51 longitudinally against the pull of the parts that are latched into the bayonet slots 53.

Bayonet slots 53 have at their inner extremities, keeper notches positioned to receive latch lugs 66 of indicator cap F so as to retain the cap F in a position in which its indicator face is flush with the outer end of housing sleeve 25', as shown in FIG. 2. These keeper notches are defined by overhanging keeper jaws 57 against which the lugs 66 are engaged under the spring loading transmitted by barrel spring 44.

Indicator cap unit F comprises a lamp socket 60 of metal consisting in a central sleeve portion 61 having a frusto-pyramidal head 62 at its outer end, a square integral collar 63 adjoining head 62, and a square collar 64 axially spaced from collar 63. A square latch plate 65, having the diametrically opposed latch lugs 66, is attached to the flange 64 by integral fingers 67 projecting axially therefrom and bent inwardly into the annular groove defined between collars 63 and 64 as best illustrated in FIG. 2. In FIG. 1, the fingers 67 are shown in an open condition prior to assembly. The latch plate 65 has a round central opening through which the rearwardly projecting portion of socket sleeve 61 extends.

A small lamp bulb (e.g. neon or incandescent bulb) 68 is received in the socket 60, and has a base contact in the form of a flange 69 engaged against the rear end of socket sleeve 61. Electrical connection is thus established from the base contact through the socket 60 and latch plate 65 and lugs 66 thereof to the keeper bars 51. From the terminal unit E which has the terminal tail 52, this side of the circuit is carried to an external wiring connection.

The bulb 68 has a central contact 70 (FIG. 3), which seats against the head 43 of the spring mounted terminal plunger 41. External connection to this side of the lamp is provided for by the terminal tail 42 which is electrically connected through bushing 40 to the plunger 41.

Molded onto the socket head 62 is a lens cap 71 having a central aperture 72 to receive the forward end of light bulb 68 and having a forwardly extending, pyramidally flaring skirt 73. A face plate or window 74, having a suitable designating character 75 (which may be of opaque material) imprinted thereon or inlaid therein, and having at one end a dot 76 similarly applied, is secured to skirt 73. The lens plate 74 is of light-transmitting character, preferably translucent. Alternatively, it could be transparent, or of opaque material with the character 75 formed as an aperture therein. A suitably heat resistant plastic material, such as cellulose acetate butyrate (e.g. Tenite H-3 high temperature type, which has the required optical clarity) is preferably used. Lens cap 71 likewise may be of translucent molded plastic material, and is preferably of a plastic material similar chemically to that of window 74 so that the latter may be secured to the cap adhesively by the well known technique of applying a solvent to the surfaces to be adhered. The marginal areas of the rear face of lens plate 74 are thus secured adhesively to the forward face of lens cap skirt 73.

Operation

In operation, the assembled unit will function as a simple indicator light, with current supplied to the light bulb 68 through the terminals 42 and 52 and the internal connections hereinbefore described.

To remove the indicator cap F, as for replacement of a burned out bulb 68, pressure of a finger tip (indicated at 80 in FIG. 2) is applied to that end of the face plate 74 which is designated by the dot 76. Under such pressure, the cap F will be slightly depressed against the spring 44, releasing the frictional engagement between lugs 66 and the overhanging shoulders of jaws 57. The spring pressure, applied along the axis of plunger 41, will react against the finger tip pressure applied through cap F along an axis extending between dot 76 and the point of contact of the rear end of lamp 68 against the head 44 of plunger 41, which latter axis, indicated in FIG. 2 by the broken line 81, subtends an obtuse angle to the axis of plunger 41, and there will be a resultant force applied to lugs 66 in the transverse direction (approximately bisecting the obtuse angle between the axes of the applied forces) such as to move the lugs 66 laterally out of the keeper notches into the open throats of bayonet slots 53, and past the tips of jaws 57. The lugs 66 are then freed so as to be released outwardly through the open throats of bayonet slots 53 by releasing the finger tip pressure at dot 76, and by inverting the unit cap F can be dropped out of the open end of the sleeve 25'.

To replace the cap F, it is tilted to a position approximately as shown in FIG. 9, where lugs 66 are lined up with the open throats of bayonet slots 53, and is inserted into the open end of sleeve 25' until the lugs 66 are received in the bayonet slots in approximately the positions shown in FIG. 9. It may be noted that, in this position of the cap unit F, the center contact of lamp 68 will engage against the plunger head 43 near the periphery thereof. Pressure is then applied to the outwardly projected end of cap unit F approximately as indicated by the arrow 82, slightly depressing the plunger 41 and moving the lugs 66 into the bottoms of the bayonet slots 53. The transverse component of pressure 82 will cause the lugs 66 to engage against the ends of keeper jaws 57 and slide downwardly against the end surfaces thereof until the lugs can enter the keeper notches at the bottoms of the bayonet slots 53, whereupon the cap unit F will tilt to a position in which its major axis is aligned with the axis of plunger 41 and the lugs 66 are received in the keeper notches. The movements of the lugs during this operation are indicated approximately by the arcuate arrow 84 in FIG. 9.

Upon release of pressure against the cap F, the lugs 66 will be spring loaded against the under shoulders of jaws 57 to retain the cap securely latched in the sleeve 25'.

FIGS. 7 and 8 illustrate how a plurality of vertical tiers of the indicator units can be attached to one another by the bridge plate G, secured to the tops and bottoms of the tiers in overlapping or bridging relation to adjacent tiers, by means of the bolts or rivets 21 extended through the bores 20 of the respective indicator units, with the units arranged in horizontal rows, side by side, as well as in the vertical tiers. The vertical tiers are secured to one another against horizontal separation by the bridging action of the plates G. The horizontal rows are secured to one another against vertical separation by the long bolts or rivets 21 which extend full length vertically from top to bottom of the assembly as indicated in dotted lines in FIG. 7, in the leftward tier thereof. The mounting bracket parts 26-28 are secured to the four corners of the rectangular assembly of units, for mounting the assembly to the panel C, with the forward end of the assembly projecting into an aperture 29' of appropriate size in the panel C. FIG. 2 illustrates the mounting of only a single unit projecting into an aperture of single unit size in a panel, which may be desirable in some instances.

Although the indicator faces of cap units F may for some uses be square, the face area (and, correspondingly, the cross-section) of cap unit F for most applications, will be of elongated rectangular form, with the minor cross-sectional axis being parallel to the common transverse axis of latch lugs 66, and with the major cross-sectional axis of the indicator face extending through dot 76, normal to such minor axis. The direction of swinging movement of lugs 66 in their latching and unlatching movements is generally parallel to such major cross-sectional axis.

We claim:
1. In an indicator light, in combination: a housing including a sleeve defining an openable end thereof; an indicator cap and lamp assembly including a cap of non-circular cross-section normally receivable within said sleeve in a position closing said openable end, said cap having a front face, normally disposed at right angles to the longitudinal axis of said housing, for displaying indicia, and having a lamp socket in the back thereof, on an axis normal to said front face, for holding a lamp bulb having an end contact; a spring loaded contact mounted in said housing on said longitudinal axis for engagement by said end contact; said cap having releasable latching means comprising a pair of latch lugs projecting laterally from respective sides of said cap on a common transverse axis and a pair of spaced parallel keeper members mounted in said housing on opposite sides thereof so as to define between them a socket space to receive said lamp socket, said keeper members being provided with respective bayonet slots having at their inner extremities, keeper notches extending in a common direction transversely of said common transverse axis to receive said lugs so as to retain said cap assembly in said normal closing position, said bayonet slots having open throats extending parallel to said longitudinal axis facing toward the said openable end of the housing and offset laterally from the common transverse axis of said lugs when said cap unit is in said normal closing position, whereby release of said lugs from said bayonet slots is accomplished by pressure on said indicator face near a marginal extremity thereof which is on the opposite side of said common transverse axis from said throats, said pressure reacting with the opposing pressure of said spring-loaded contact along respective pressure paths intersecting at an obtuse angle less than 180° at the point of engagement of said contacts, to develop a transverse resultant of force in a direction toward said throats, effective to tilt said cap assembly on a transverse axis parallel to the said common transverse axis of the lugs, whereby to shift said lugs transversely into said throats to release the cap for removal from the housing.

2. An indicator light as defined in claim 1, wherein said lamp socket comprises a metallic sleeve adapted to establish electrical connection from a lateral contact of a lamp mounted therein, through one of said lugs and its coacting keeper member to one side of an electrical energizing circuit while connection is established through said end contact and spring loaded contact to the other side of such circuit.

3. An indicator light as defined in claim 2, wherein said cap is of plastic material molded onto the outer end of said lamp socket sleeve and has a translucent face plate covering its front side and carrying said indicia.

4. In an indicator light, in combination: a housing including a sleeve of rectangular cross section defining an openable end thereof; an indicator cap assembly of T-form including an elongated cap of rectangular periphery fitted within said sleeve, having a transverse axis of tilting movement normal to the longitudinal axis of the housing and having an indicator face normally disposed in a position closing said openable end of said housing, and a tubular socket projecting from the back of said cap on an axis normal to said end face, for holding a lamp bulb having an end contact; a spring loaded contact mounted in said housing for engagement by said end contact; and releasable latching means comprising a pair of latch lugs projecting laterally from respective sides of said cap parallel to said transverse axis and a pair of keeper members mounted in said housing on opposite sides in spaced parallel planes normal to said transverse axis so as to define between them a socket space to receive said lamp socket, said keeper members being provided with respective bayonet slots having at their inner extremities, keeper notches extending in a common direction transversely with reference to said axis of tilting movement, to receive said lugs so as to retain said cap assembly in said normal closing position with said end face normal to said longitudinal axis thereof, and said slots having throats opening toward the said openable end of the housing and offset laterally from the common transverse axis of said lugs when said cap unit is in said normal closing position, whereby release of said lugs from said bayonet slots is accomplished by pressure on that end of said indicator face which is on the opposite side of said common transverse axis from said throats, said pressure reacting with the opposing pressure of said spring loaded contact along respective pressure paths intersecting at an obtuse angle less than 180° at the point of engagement of said contacts, to develop a transversely directed resultant of force effective to tilt said cap unit about said transverse axis of tilting movement whereby to shift said lugs along said keeper notches into said throats to release the cap for removal from the housing.

5. In an indicator light, in combination: a housing including a sleeve of elongated cross section transversely of its longitudinal axis, defining an openable end thereof; an indicator cap assembly including an elongated cap of molded plastic material fitted within said sleeve with its major axis normal to the said longitudinal housing axis in a normal closed position of said cap, and having a translucent lens plate providing an indicator face disposed as the end face of said housing, and a tubular metal socket having a forward end molded into the back of said cap and a rear end portion projecting rearwardly therefrom, with its axis normal to said end face, for holding a lamp bulb having an end contact, said socket having a pair of lugs projecting from opposite sides thereof transversely of said major cap axis on a common axis intersecting and normal to said socket axis; a spring-loaded contact mounted in said housing for engagement by said end contact; and a pair of substantially flat keeper members mounted in said housing on opposite sides thereof in planes parallel to the longitudinal housing axis and parallel to said major axis of the cap in the closed position thereof, said keeper members defining between them a socket space to receive said projecting rear end portion of the lamp socket with said lugs intersecting said planes; said keeper members being provided with respective bayonet slots having, at their inner extremities, keeper notches to receive said lugs so as to retain said cap assembly in a normal position closing said openable end of the housing, with said end face normal to said longitudinal axis thereof, and said slots having open throats facing toward the said openable end of the housing and offset laterally from the common transverse axis of said lugs when said cap unit is in said normal closing position, whereby release of said lugs from said bayonet slots is accomplished by pressure on that end of said indicator face which is on the opposite side of said common transverse axis from said throats.

6. In an indicator light, in combination: a housing including a sleeve of elongated cross-section having a major axis normal to the longitudinal axis of the housing, defining an openable end thereof; an indicator cap assembly including an elongated cap received within said sleeve with its major axis normal to said longitudinal axis in a normal closed position of said cap, and having an indicator face disposed as the end face of said housing, and a tubular metal socket having a forward end secured to the back of said cap and communicating with the interior thereof, and a rear end portion projecting rearwardly therefrom with its axis normal to said end face, for holding a lamp bulb having an end contact; said socket having a pair of lugs projecting from opposite sides thereof on a common axis transverse of said major cap axis; a spring-loaded contact mounted in said housing for engagement by said end contact; and a pair of substantially flat keeper members mounted in said housing on opposite sides thereof in planes parallel to the said major axis of the cap in the closed position thereof, said keeper members defining between them a socket space to receive said lamp socket with the common axis of said lugs extending transversely between said keeper members; said keeper members having respective keeper means interengaging with said lugs to latch said cap assembly in said normal closed position thereof, said keeper means being arranged for release of said lugs upon swinging movement of said cap assembly wherein said lugs move transversely of said housing in a direction generally parallel to said major cross-sectional axis thereof, whereby said release is accomplished by applying finger tip pressure to said indicator face near an end thereof which is on the opposite side of said common lug axis from the side toward which said lugs move in their said releasing movement.

7. In an indicator light, in combination: a housing including a core of insulating material of rectangular cross section having forward and rear end portions of tubular form and a transverse central web between said end portions, said web having a central aperture and a pair of lateral slots extending axially therethrough on opposite sides of said aperture, and a pair of sleeve sections of metal channel section jointly constituting a jacket surrounding said core and projecting beyond the forward end portion thereof to provide a sleeve of elongated cross-section defining an openable front end of said housing; an indicator cap assembly of T-form including a cap of elongated cross-section fitted within said sleeve with its major and minor axes normal to the longitudinal axis of the housing and having an indicator face disposed as the end face of said housing, and a tubular socket projecting from the back of said cap on an axis normal to said end face into the tubular forward end portion of said core, for holding a lamp having an end contact; a rear end cap of insulating material having a shank received in the rear end portion of said core; a spring-loaded contact plunger mounted in said rear end cap for sliding movement on said longitudinal housing axis and projecting through said central aperture of the web into said forward end portion of the core, for engagement by said lamp end contact; and releasable latching means comprising a pair of latch elements on respective sides of said lamp socket on a common transverse axis parallel to said minor axis of the indicator cap, and a pair of keeper bars mounted in said housing between respective sides of said shank and said rear end portion of the core and projecting through said lateral slots in embracing relation to said lamp socket with said sides of the lamp socket in adjacent face-to-face opposition to said keeper bars, said keeper bars being provided with respective latch members arranged to receive said latch elements as to retain said indicator cap in a normal position closing said openable end of the housing, with said indicator face normal to said longitudinal axis thereof, release of said latch elements from said latch members being accomplished by pressure on an end of said indicator face on one side of said minor indicator cap axis, said pressure reacting with the opposing pressure of said spring-loaded contact to develop a transversely directed resultant of force effective to tilt said indicator cap so as to shift said latch elements generally parallel to said major axis of the indicator cap, to effect said release.

8. In an indicator light, in combination: a housing including a core of insulating material of rectangular cross section having forward and rear end portions of rectangular tubular form and a transverse central web between said end portions, said web having a central aperture and a pair of lateral slots extending axially therethrough on opposite sides of said aperture, and a pair of sleeve sections of rectangular metal channel section jointly constituting a jacket surrounding said core and projecting beyond the forward end portion thereof to provide a sleeve of rectangular cross-section defining an openable front end of said housing; an indicator cap assembly of T-form including a cap of rectangular cross-section fitted within said sleeve with its major and minor axes normal to the longitudinal axis of the housing and having an indicator face disposed as the end face of said housing, and a tubular socket projecting from the back of said cap on an axis normal to said end face into the tubular forward end portion of said core, for holding a lamp having an end contact; a rear end cap of insulating material having a rectangular shank received in the rear end portion of said core; a spring-loaded contact plunger mounted in said rear end cap for sliding movement on said longitudinal housing axis and projecting through said central aperture of the web into said forward end portion of the core, for engagement by said lamp end contact; a pair of keeper bars mounted in said housing between respective sides of said shank and said rear end portion of the core and projecting through said lateral slots in embracing relation to said lamp socket with said sides of the lamp socket in adjacent face-to-face opposition to said keeper bars, said lamp socket having means releasably engageable with said keeper bars to retain said indicator cap assembly in a normal position closing said openable end of the housing, with said indicator face normal to said longitudinal axis thereof.

9. An indicator light as defined in claim 8, wherein said rear end cap has a head comprising a radial flange on its rear end, said flange having a slot extending axially therethrough at one side thereof; and further including a terminal tail projecting through said flange slots and an L-web joining said tail to one of said keeper bars and retained between a corner of said shank and an opposed corner of the internal wall of said rear end portion of the core, said tail and its respective keeper bar being thus disposed in planes defining a right dihedral angle.

References Cited in the file of this patent
UNITED STATES PATENTS

| | | |
|---|---|---|
| 2,677,124 | Hallerberg et al. | Apr. 27, 1954 |
| 2,825,896 | Schellman et al. | Mar. 4, 1958 |
| 2,925,592 | Noyes | Feb. 16, 1960 |